United States Patent
Smits

(10) Patent No.: US 10,082,664 B2
(45) Date of Patent: Sep. 25, 2018

(54) TRACKING OPTICS FOR A MOBILE DEVICE

(71) Applicant: Samsung Electronics Co., Ltd., Gyeonggi-do (KR)

(72) Inventor: Dirk Smits, San Jose, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 479 days.

(21) Appl. No.: 14/493,110

(22) Filed: Sep. 22, 2014

(65) Prior Publication Data

US 2015/0085096 A1    Mar. 26, 2015

Related U.S. Application Data

(60) Provisional application No. 61/881,055, filed on Sep. 23, 2013.

(51) Int. Cl.
| | | |
|---|---|---|
| *H04N 9/47* | (2006.01) | |
| *G09G 5/02* | (2006.01) | |
| *G02B 23/02* | (2006.01) | |
| *H04N 5/225* | (2006.01) | |
| *G06K 9/00* | (2006.01) | |
| *H04N 5/232* | (2006.01) | |

(52) U.S. Cl.
CPC ......... *G02B 23/02* (2013.01); *G06K 9/00604* (2013.01); *H04N 5/2254* (2013.01); *H04N 5/2256* (2013.01); *H04N 5/2257* (2013.01); *H04N 5/23219* (2013.01)

(58) Field of Classification Search
CPC ..... H04N 5/2257; H04N 5/2256; G02B 23/02
See application file for complete search history.

(56) References Cited

U.S. PATENT DOCUMENTS

| | | | | |
|---|---|---|---|---|
| 8,457,367 | B1* | 6/2013 | Sipe .................. | G06K 9/00221 382/118 |
| 8,824,779 | B1* | 9/2014 | Smyth ................ | G06K 9/0061 382/100 |
| 9,041,787 | B2* | 5/2015 | Andersson .......... | G06F 3/013 348/61 |
| 2010/0033677 | A1* | 2/2010 | Jelinek .............. | G06K 9/00604 351/208 |
| 2010/0078747 | A1* | 4/2010 | Chuang ............. | H01L 27/14618 257/435 |
| 2010/0278394 | A1* | 11/2010 | Raguin .............. | G06K 9/00604 382/117 |
| 2012/0154536 | A1* | 6/2012 | Stoker ................ | H04N 5/2258 348/46 |

(Continued)

*Primary Examiner* — Tsion B Owens
(74) *Attorney, Agent, or Firm* — Convergent Law Group LLP

(57) ABSTRACT

Exemplary embodiments provide a tracking optics system for mobile devices. The tracking optics system may comprise a telescope longitudinally disposed in a case of the mobile device, wherein a length of the telescope is greater than a depth of the mobile device; an illuminator that emits a light source and low-power mode through the telescope towards a target of image capture; a two-axis gimbal mirror that is adjusted to steer the light source towards the target until the target is within a field of view of the telescope; and an image sensor that captures an image of the target in response to the illuminator emitting the light source in high power mode to flash the target.

24 Claims, 5 Drawing Sheets

(56) References Cited

U.S. PATENT DOCUMENTS

2013/0267204 A1* 10/2013 Schultz ................ H04W 12/06
                                                           455/411
2014/0313377 A1* 10/2014 Hampton ............. H05K 5/0217
                                                           348/241

* cited by examiner

TRACKING OPTICS FOR A MOBILE DEVICE

CROSS-REFERENCE TO RELATED APPLICATIONS

This application claims the benefit of provisional Patent Application Ser. No. 61/881,055, filed Sep. 23, 2013, assigned to the assignee of the present application, and incorporated herein by reference.

BACKGROUND

Most types of mobile devices include at least one camera that faces the user, typically referred to as a front-facing camera. Front-facing cameras may be used for applications such as videoconferencing and gaze tracking, for example. However, the optics used in front-facing cameras have many limitations.

One cause of these limitations is the depth of the form factors used to house the optics. For example, in a mobile phone, the front-facing camera, and any primary rear-facing cameras, are typically disposed along the z-axis (depth) of the phone. As the trend is toward thinner phones, the depth of the phone casing limits the length of the camera. This size limitation results in front-facing cameras having a very small focal length, which in turn limits the aperture (light capture). Other limitations of front-facing cameras include having a wide field of view, a fixed focal point of approximately 600 mm to 800 mm, and a smaller, lower resolution image sensor than the primary rear-facing camera. The lens quality on front-facing cameras is also subpar compared with rear-facing cameras, which may result in artifacts in the images.

The result of these limitations is that front-facing cameras pose challenges for mobile device applications that require images of a certain quality, such as iris recognition for biometric authentication and gaze tracking, for example.

Iris recognition uses mathematical pattern recognition techniques on video images of a user's iris, which has unique random complex patterns. Iris recognition algorithms need images that are sufficiently high resolution and have enough contrast to distinguish the patterns in the iris.

Many iris scanning applications have been built and deployed, typically for purposes of access control or flow control at large facilities such as airports, for example. Iris recognition requires infrared light because the structures of the Iris are not visible in visible light. Therefore, iris recognition systems require an infrared illumination source and an image sensor capable of detecting infrared light. These installations typically have high quality stationary imagers having complex and expensive optics and large image sensors capable of taking images and scanning irises of individuals at distances up to 2 m.

Implementing such an iris-based authentication system in a mobile device proves challenging due to the problems described above with front-facing cameras, such as small focal length, limited aperture, and a wide field of view. Attempting to capture an image of an iris with a wide field of view could result in the image capturing the user's iris in only a couple of pixels, i.e., with insufficient resolution of details The fixed focal point, the low resolution image sensor and the subpar lens quality on front-facing cameras may also result in low quality, noisy images having artifacts. Furthermore, the phone is a moving object so there may be problems with motion blur, resulting in a reduction in image sharpness and contrast. The problem with motion blur may be compounded by the fact that the user has to manually aim the front-facing camera of the phone at the user's eye. The above problems may cause current iris recognition algorithms to fail if the user's eye is placed further than approximately five to eight inches from the mobile device. However, due to the fixed focal length the front-facing camera, the resulting image of the user' eye at such a distance might be blurry due to the fixed focal length.

An additional problem is that because Iris recognition requires the use of infrared light, an issue with power may arise because an infrared light source could be a significant drain on the mobile device battery. The infrared light source could also be a health and safety issue since the user would be required to place his/her eye very close to the light source.

Accordingly, what is needed is an improved optic systems for mobile devices, particularly for use with applications that utilize front-facing cameras.

BRIEF SUMMARY

The exemplary embodiments provide methods and systems for tracking optics for mobile devices that are suitable for mobile device applications, such as iris recognition, for example. According to one embodiment, the tracking optics system may comprise a telescope longitudinally disposed in a case of the mobile device, wherein a length of the telescope is greater than a depth of the mobile device; an illuminator that emits a light source and low-power mode through the telescope towards a target of image capture; a two-axis gimbal mirror that is adjusted to steer the light source towards the target until the target is within a field of view of the telescope; and an image sensor that captures an image of the target in response to the illuminator emitting the light source in high power mode to flash the target.

BRIEF DESCRIPTION OF SEVERAL VIEWS OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Figures 1A, 1B:
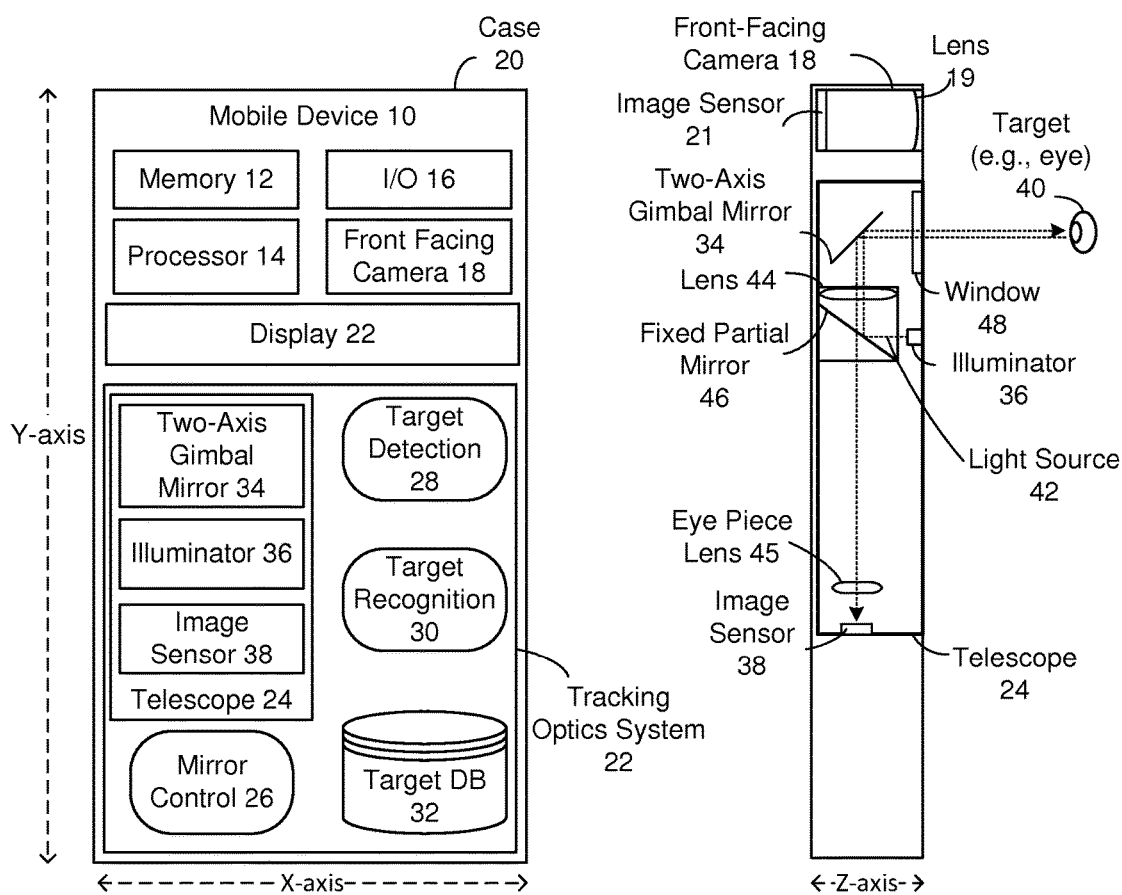
FIG. 1A is a block diagram illustrating an exemplary embodiment of tracking optics system for a mobile device.
FIG. 1B is a diagram of a cut away-side view showing some components of the mobile device.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Advantages and features of the present invention and methods of accomplishing the same may be understood more readily by reference to the following detailed description of embodiments and the accompanying drawings. The present general inventive concept may, however, be embodied in many different forms and should not be construed as being limited to the embodiments set forth herein. Rather, these embodiments are provided so that this disclosure will be thorough and complete and will fully convey the concept of the general inventive concept to those skilled in the art, and the present general inventive concept will only be defined by the appended claims. In the drawings, the thickness of layers and regions are exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The term "component" or "module", as used herein, means, but is not limited to, a software or hardware component, such as a field programmable gate array (FPGA) or an application specific integrated circuit (ASIC), which performs certain tasks. A component or module may advantageously be configured to reside in the addressable storage medium and configured to execute on one or more processors. Thus, a component or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules may be combined into fewer components and components or modules or further separated into additional components and components or modules.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

The exemplary embodiments provide a mobile device with a tracking optics system that may work in conjunction with a standard front-facing camera to provide high-quality images suitable for mobile device applications, such as iris recognition and gaze tracking, for example. The tracking optics system may comprise a telescope longitudinally disposed in the mobile device, where the length of the telescope is greater than a depth of the mobile device. In one embodiment, the telescope may include a two-axis gimbal mirror, an illuminator, and an image sensor. In operation, the illuminator sends a light source in low power mode through the telescope to illuminate a target. A feedback loop from the standard front-facing camera is used to adjust the mirror to steer the light source towards the target until the target is within the field of view of the telescope, providing dynamic target acquisition. The illuminator then flashes the target with the light source in high power mode and an image is captured using the image sensor of the telescope.

Disposing the telescope along the longitudinal-axis of the mobile device, rather than along the z-axis, eliminates any constraint that the depth of the mobile device may have on the length of the telescope. In the embodiment where the tracking optics system is used for iris recognition, the tracking optics system is capable of capturing images of an iris even when the mobile device is held by user at an arm length range, e.g., 40 to 50 cm. In addition, because the tracking optics system performs dynamic target acquisition, the telescope may aims itself towards the user's iris, rather than the user having to aim his or her eye towards the camera.

FIG. 1A is a block diagram illustrating an exemplary embodiment of tracking optics system for a mobile device. FIG. 1B is a diagram of a cut away-side view showing some components of the mobile device, wherein like reference numerals from FIG. 1A have like reference numerals. It should be understood that the drawings are not to scale and that other configurations of telescoping optics or magnifying optics are equally covered by the scope of the exemplary embodiments.

Referring to both FIGS. 1A and 1B, the system includes a mobile device 10 having conventional components including a memory 12, at least one processor 14, input output devices (I/O) 16, a front-facing camera 18, and a display 22.

The memory 12, the processor 14, the I/O 16, the front-facing camera 18 and the display 22 may be coupled together via one or more system buses (not shown). The memory 12 may comprise one or more memories comprising different memory types, including RAM, ROM, cache, virtual memory and flash memory, for example. The processor 14 may include a single processor having one or more cores, or multiple processors having one or more cores. The I/O 16 is a collection of components that input information and output information. Example components comprising the I/O 16 include a microphone, speaker, and a wireless network interface controller (or similar component) for communication over the network. The processor 14 may execute an operating system (OS) that manages hardware resources and performs basic tasks. Examples of the OS may include Symbian™, BlackBerry OS™, iOS™, Windows™, and Android™. In one embodiment, the display 22 may be integrated with the mobile device 10, while in another embodiment, the display 22 may be external from the mobile device 10.

In one embodiment, the mobile device 10 may comprise any type of mobile device form factor, including but not limited to, a cell phone, a tablet, a notebook or laptop computer, a television, and a wearable computer, for example. In one embodiment, the mobile device 10 may be implemented with the display 22 and the front-facing camera 18 located on the same side of the mobile device 10, such that the front-facing camera 18 is pointed at the user has the user holds the device to view the display 22. In the embodiment where the mobile device 10 comprises a laptop or notebook, the front-facing camera is typically housed within a lid of the laptop.

The mobile device 10 contains the components in a housing or case 20 having an x-axis, a y-axis or longitudinal-axis, and a z-axis (depth). As shown in FIG. 1B, the front-facing camera 18, which includes its own lens 19 and image sensor 21, is typically disposed along the z-axis of the case 20. As the trend is toward thinner mobile devices, the depth of the case 20 limits the length of the front-facing camera 18, and constrains the quality of images produced by the front-facing camera 18.

Accordingly, the exemplary embodiments provide a tracking optics system 22 that is capable of tracking a target of image capture and producing images that are of a quality suitable for use in applications, such as iris recognition for biometric authentication and gaze tracking, for example. In one embodiment, a tracking optics system 22 comprises a telescope 24, a mirror control component 26, a target detection component 28, a target recognition component 30 and an optional target database 32.

According to one aspect of exemplary embodiment, the telescope 24 may be disposed along a longitudinal-axis of the mobile device 10, such that the telescope length (L) is greater than the depth (Z) of the mobile device casing 20. Disposing the telescope 24 along a longitudinal-axis of the mobile device 10 avoids any limitations that would be placed on the length of the telescope by the depth of the case 20.

In one embodiment, the telescope 24 may operate to gather light and form an image using a combination of a two-axis gimbal mirror 34, an illuminator 36, and an image sensor 38. The two-axis gimbal mirror 34 refers to a mirror mounted on a two-axis gimbal so that the mirror may be moved about two axis of rotation, e.g., the X- and Y-axis.

The function of the illuminator 36 is to shine a light source 42 on the target 40 of image capture, which in one example, could be an eye or an iris of the eye. In one embodiment, the illuminator 36 may be implemented using micro light emitting diodes (LEDs) or a laser diode. In an embodiment where the tracking optics system 22 is used for iris recognition, the illuminator 36 may comprise an infrared (IR) or near infrared (NIR) illuminator that produces an IR light source.

The image sensor 38 converts an optical image of the target 40 into an electronic signal for subsequent image processing. In one embodiment, the image sensor 38 may comprise a digital charge-coupled device (CCD) or complementary metal-oxide-semiconductor (CMOS) active pixel sensors.

In one embodiment, the two-axis gimbal mirror 34, the illuminator 36, and the image sensor 38 may be integrated into the telescope 24. In another embodiment, one or more of the two-axis gimbal mirror 34, the illuminator 36, and the image sensor 38 may be implemented outside of the telescope 24.

Referring to FIG. 1B, in one embodiment the telescope 24 may also include a lens or lenses 44, a fixed partial mirror 46, and an eyepiece lens 45 close to the image sensor 38. In this embodiment, the illuminator 36 is positioned along a side of the telescope 24, and the light source 42 emitted from illuminator 36 is reflected off of the fixed partial mirror 46 towards the two-axis gimbal mirror 34. In one embodiment, the fixed partial mirror 46 is partially reflective so that only a partial portion of the light is reflected, such as 50% for example. The two-axis gimbal mirror 34 reflects the light source 42 out through a window 48 in the mobile device casing 20 towards the target 40. The light source 42 reflects back off of the target 40 and is reflected by the two-axis gimbal mirror 34 towards the eyepiece lens 45 and the image sensor 38 to obtain the image.

Figure 1C:
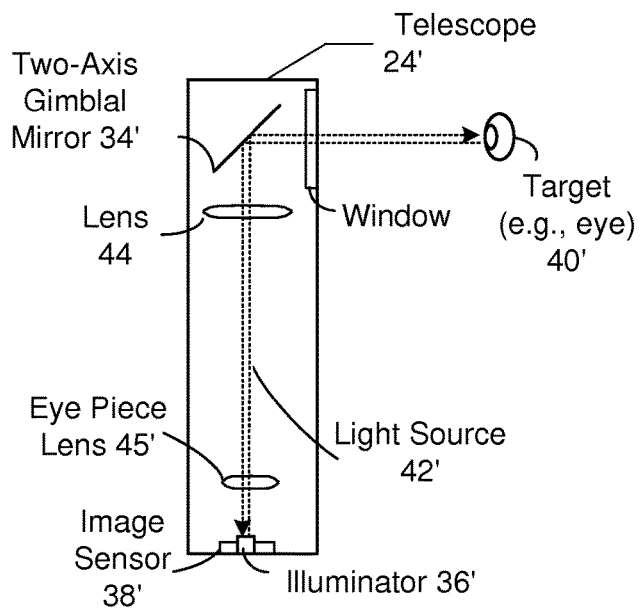
FIGS. 1C and 1D are block diagrams illustrating other embodiments for the telescope and image sensor.
Figure 1D:
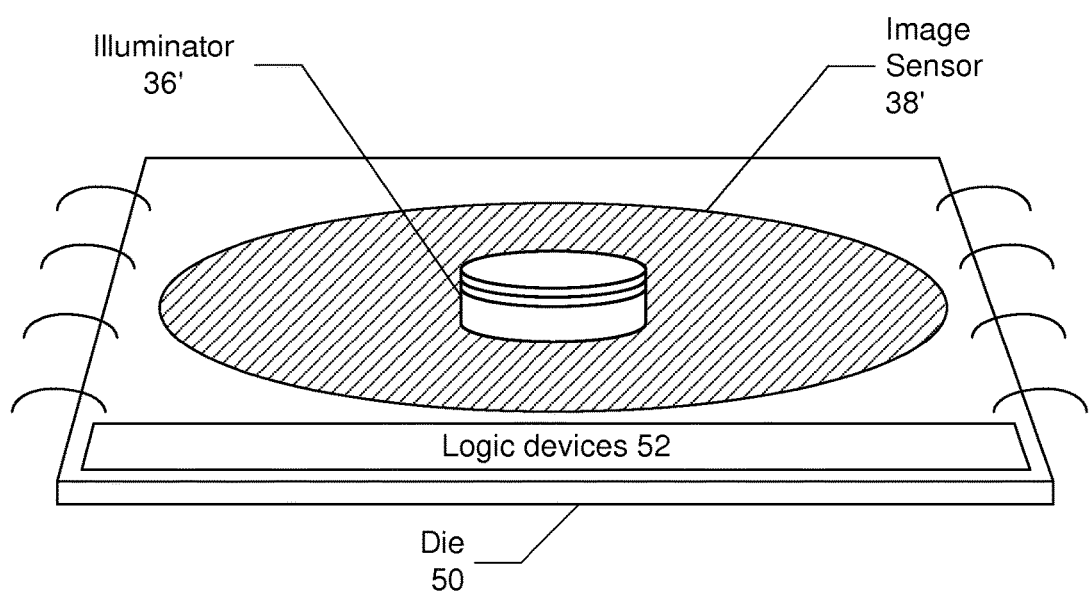

FIGS. 1C and 1D are block diagrams illustrating alternative embodiments for the telescope 24' and image sensor 38'. According to another aspect, the image sensor 38' may be implemented in a shape that matches the shape of the target 40'. In the example where the intended target 40' is only the iris of the eye, the image sensor 38' may be implemented in an annular shape, such that only annular images are captured, like an iris. In one embodiment, the annular-shaped image sensor 39' may be placed on a standard square or rectangular die 50, in which logic devices 52 could be placed in portions of the die 50 not covered by the image sensor 38'.

The exemplary embodiments recognize that the pupil of the eye is not required for iris recognition, and therefore, provides the annular-shaped image sensor 38' with an open middle portion. According to this embodiment, the illuminator 36' may be located collinear with the image sensor 38' within the open middle portion of image sensor 38' such that illuminator 38' emits the light source through the open middle portion. In an alternative embodiment, the illuminator 36' may be located above or below the open middle portion of the image sensor 38'. This collinear arrangement of the illuminator 36 and image sensor 38' eliminates the need for the fixed partial mirror 46 shown in FIG. 1B. A further advantage of elevating the light source, away from the sensor, towards the lens system and out of the focal plane in which the sensor is placed, is that light emanating from a highly concentrated NIR source, such as a Laser Diode, can be defocussed sufficiently into a more diffuse spot light onto the target ensuring eye safety.

According to the tracking optics system 22 shown in FIGS. 1A-1D, reliable iris recognition and biometric authentication may be performed even when the mobile device 10 is held by user at an arm length range, e.g., 40 to 50 cm. In a further aspect of the exemplary embodiment, the tracking optics system 22 is capable of automatically guiding the light source to the target for dynamic target acquisition, as further described below.

In one embodiment, the mirror control component 26, the target detection component 28, and the target recognition component 30 may be implemented as software components that may be maintained in the memory 12 and executed by the processor 14. In another embodiment, the components could be implemented as a combination of hardware and software. Although the mirror control component 26, the target detection component 28, and the target recognition component 30 are shown as single components, the functionality of each may be combined into a lesser or a greater number of modules/components.

Figure 2:
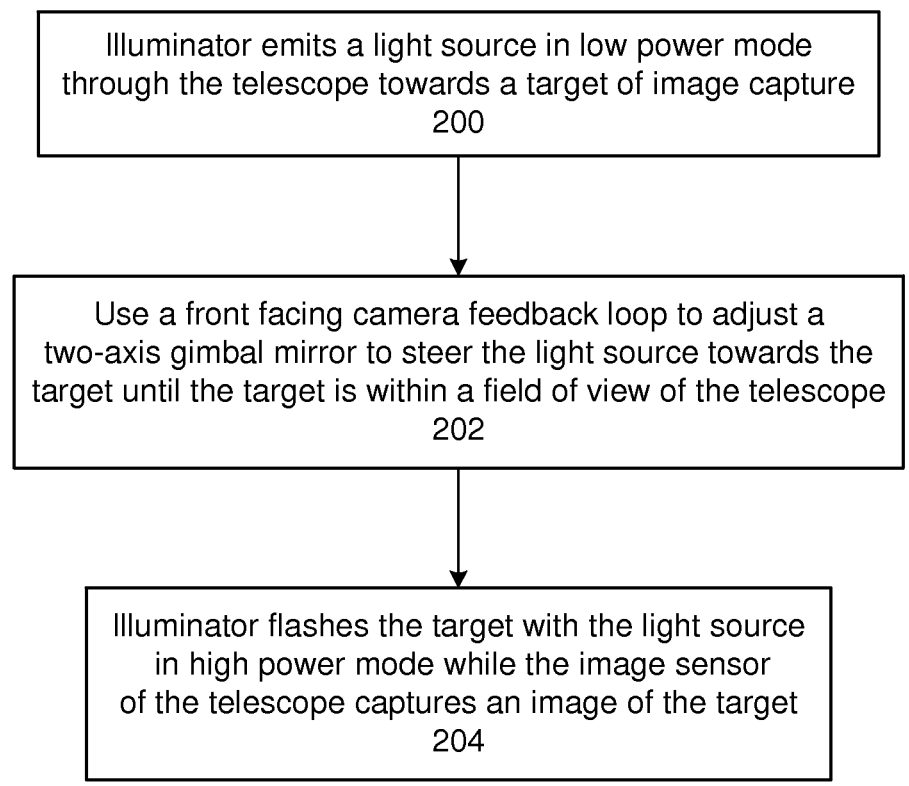
FIG. 2 is a flow diagram illustrating a process performed by the tracking optics system during operation.

FIG. 2 is a flow diagram illustrating the process performed by the tracking optics system during operation. Responsive to the target recognition component 30 receiving a command to initiate target tracking and acquisition, the target recognition component 30 may instruct the illuminator 36 to emit a light source in low power mode through the telescope towards the target of image capture (block 200).

A feedback loop from the standard front-facing camera may be used to adjust the two-axis gimbal mirror 34 to steer the light source 42 towards the target until the target is within the field of view of the telescope (block 202). In one embodiment, the mirror control component 26 may be used to adjust the position of the two-axis gimbal mirror 34.

The target recognition component 30 may then instruct the illuminator 36 to flash the target with the light source 42 in high power mode and an image of the target is captured using the image sensor 38 of the telescope (block 204).

In the embodiment where the tracking optics system 22 is used for iris recognition, the target recognition component 30 may further attempt to match the image of the target (i.e., an iris) with previously registered images stored in the target database 32. If a match is found, then the user may be authenticated.

According to a further embodiment, in response to the user failing authentication, content displayed on the mobile device may be automatically filtered (e.g., not displayed) to hide the content from the non-authenticated user. This embodiment, the target recognition component provides more than just authorizing access to the mobile device 10, the target recognition component may also provide automatic content filtering on the mobile device 10 when irises of other than the user are detected.

Figure 3:
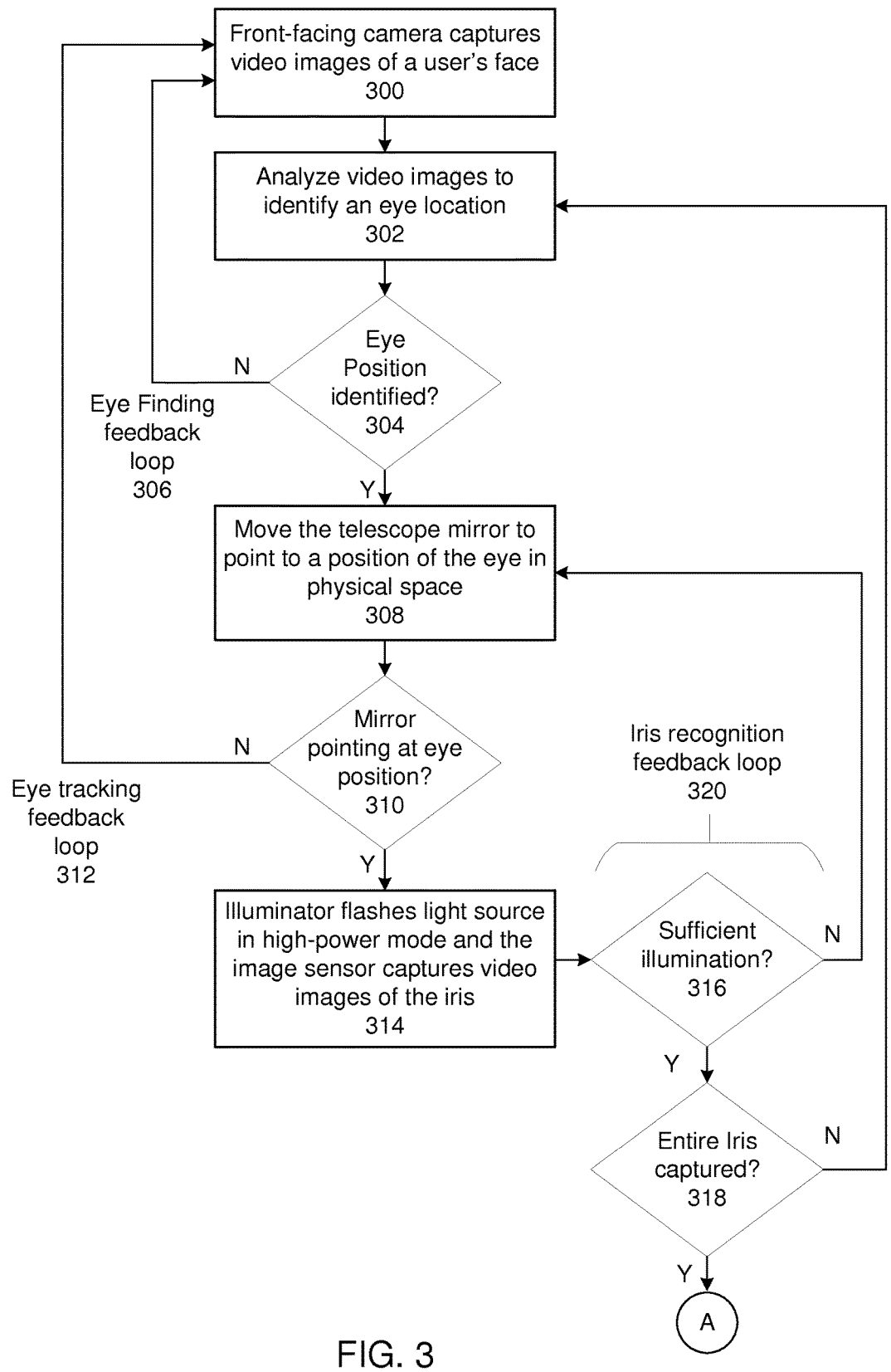
FIG. 3 is a flow diagram illustrating a process performed by the tracking optics system in further detail in an embodiment where the system is used for iris recognition.
Figure 3:
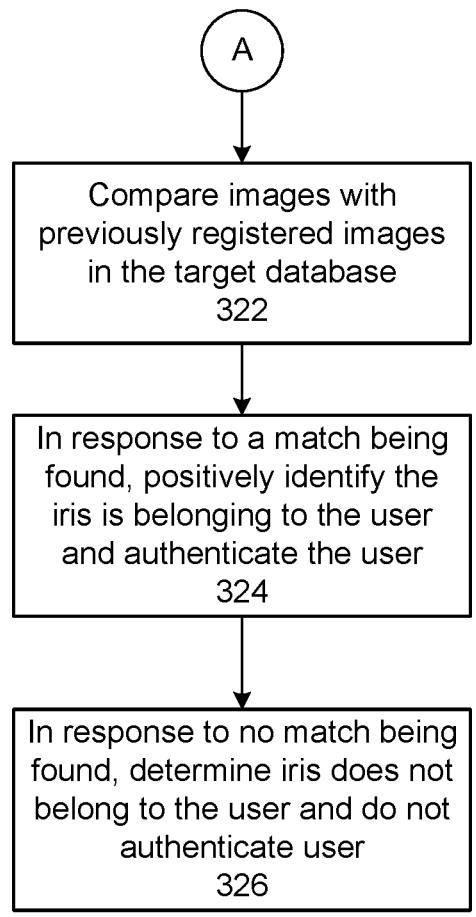

FIG. 3 is a flow diagram illustrating the process performed by the tracking optics system in further detail in the embodiment where the system is used for iris recognition. The process may begin by the target recognition component 30 instructing front-facing camera 18 to capture video images of the user's face (block 300). The target detection component 28 (e.g., eye detection) analyzes the video images and identifies and an eye location within the video images (block 302). In one embodiment, the target detection component 28 uses standard image processing techniques to place a boundary box at coordinates in the image around one of the identified eyes.

It is determined whether the eye position with an image has been identified (block 304). If not, the process continues with the front-facing facing camera 18 video image capture and analysis in an eye finding feedback loop 306.

Once the eye position has been identified (block 304), the coordinates of the boundary box may be used to instruct the mirror control component 26 to move the two-axis gimbal mirror 34 to point to a position of the boundary box in physical space (block 308). This step attempts to move the mirror 34 until the user's eye appears within the field of view of the telescope 24.

In one embodiment, block 308 may further include the target recognition component 30 instructing the illuminator 36 to emit the light source 42 in low-power brightness mode to illuminate the target. As the front-facing camera 18 produces a video feed of the user, the target detection component 28 analyzes the images to identify a bright spot from the light source 42. The target detection component 28 issues a command to the mirror control component 26 to move the two-axis gimbal mirror 34 so that the bright spot from the light source 42 lines up with the boundary box in the field of view of the front-facing camera 18. In an alternative embodiment, an additional light source with visible light could optionally be used that is easier to identify by the front-facing camera in case, for example, the front facing camera requires a NIR filter, to reduce stray natural NIR background/ambient illumination noise (e.g., reflected sunlight).

As the user and/or the mobile device may be moving, it must be determined whether the two-axis gimbal mirror 34 correctly points at the eye position (block 310). If not, the process repeats in a dynamic eye tracking feedback loop 312 in order to track the user's eye and continually reposition the mirror 34 until the mirror 34 correctly points to the identified eye position.

Once it is determined that the mirror 34 is pointing to the eye position (block 310), the target recognition component 30 instructs the illuminator 36 to briefly flash the light source 42 in high-power brightness mode, and the image sensor 38 captures video images of the iris (block 314).

The video images are fed into the target recognition component 30, which determines whether the quality of the video images are poor due to insufficient illumination (block 360). If there is insufficient illumination, then the process continues at block 308.

It is also determined whether the quality of the video images are poor due to failure to capture the entire iris (block 318). If the entire iris is not captured, then the process continues at block 302. The image quality determinations of blocks 318 and 320 form an iris recognition feedback loop 320.

Once it is determined that image is of sufficient quality, the target recognition component 30 compares the images with previously registered iris images in the target database 32 (block 322).

In response to a match being found, the iris is positively identified as belonging to the user and the user is authenticated (block 324). In response to no match being found, the iris is identified as not belonging to the user and the user is not authenticated (block 326). In an alternative embodiment, in response to a positive identification of a first eye of the user, a second eye match (the other eye) may be required to provide higher level of certainty. The front-facing camera would have identified the location of both eyes and can choose either one or both eyes as required (the iris of left eye is different from the right eye). Choosing the correct eye each time to match the iris on record in the target database may reduce or even prevent false negatives.

A method and system for a tracking optics system for mobile devices has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

I claim:

1. A tracking optics system for a mobile device, the mobile device including a camera for capturing at least one image including a target of image capture at a position, the tracking optics system comprising:
    a telescope longitudinally disposed within a case of the mobile device, wherein a length of the telescope is greater than a depth of the mobile device;
    an illuminator that emits a light source in low-power brightness mode, the light source traveling through the telescope towards the target, at least a portion of the target being initially outside of a field of view of the telescope;
    a two-axis gimbal mirror that is adjusted around two axes based on the position of the target in the at least one image to steer the light source towards the target until the target is within a field of view of the telescope; and
    an image sensor separate from the camera that captures an image of the target in response to the illuminator emitting the light source in high power brightness mode to flash the target.

2. A tracking optics system for a mobile device, comprising:
    a telescope longitudinally disposed in a case of the mobile device, wherein a length of the telescope is greater than a depth of the mobile device;
    an illuminator that emits a light source in low-power brightness mode, the light source traveling through the telescope towards a target of image capture;
    a two-axis gimbal mirror that is adjusted around two axes to steer the light source towards the target until the target is within a field of view of the telescope; and an image sensor separate from the camera that captures an image of the target in response to the illuminator emitting the light source in high power brightness mode to flash the target, wherein the illuminator emits an infrared light source and the image sensor comprises an infrared image sensor, and the target of the image comprises an iris of an eye, wherein an iris recognition component attempts to match the image of the iris with previously registered images stored to authenticate a user such that if a match is found, the user is biometrically authenticated.

3. The tracking optics system of claim 2, wherein in response to the user failing authentication, content displayed on the mobile device is filtered to hide the content from the non-authenticated user.

4. The tracking optics system of claim 2, wherein the image sensor is implemented in a shape that matches a shape of a target of image capture.

5. The optics system of claim 4, wherein the target of image capture is an iris and the image sensor is annular-shaped.

6. The optics system of claim 5, wherein the image sensor further includes an open middle portion, and wherein the illuminator is located collinear with the image sensor within the open middle portion, such that the illuminator emits a light source through the open middle portion of the image sensor.

7. The optics system of claim 2, wherein the mobile device includes a camera for capturing at least one image including the target at a position, wherein at least a portion of the target is outside of the field of view of the telescope when at least a first image of the at least one image is captured and wherein the two-axis gimbal mirror is adjusted around the two axes based on the position of the target in the at least one image.

8. The tracking optics system of claim 2, further including a lens, a fixed partial mirror, and an eyepiece lens, wherein:
the illuminator is positioned along a side of the telescope, and the light source emitted from illuminator is reflected off of the fixed partial mirror towards the two-axis gimbal mirror;
wherein the two-axis gimbal mirror reflects the light source out through a window in the case of the mobile device towards the target; and
wherein the light source reflects back off of the target and is reflected by the two-axis gimbal mirror towards the eyepiece lens and the image sensor to obtain the image.

9. The tracking optics system of claim 8, wherein one or more of the two-axis gimbal mirror, the illuminator, and the image sensor are implemented outside of the telescope.

10. A tracking optics system, comprising:
a telescope longitudinally disposed in a case of the mobile device, wherein a length of the telescope is greater than a depth of the mobile device;
a two-axis gimbal mirror;
an illuminator;
an image sensor; and
a processor configured to:
activate the illuminator in low power brightness mode to send a light source through the telescope towards a target of image capture;
adjust a position of the two-axis gimbal mirror around two axes to steer the light source towards the target until the target is within a field of view of the telescope;
activate the illuminator in high power brightness mode to flash the target, while the image sensor captures an image of the target;
wherein the illuminator emits an infrared light source and the image sensor comprises an infrared image sensor, and the target of the image comprises an iris of an eye, wherein an iris recognition component attempts to match the image of the iris with previously registered images stored to authenticate a user such that if a match is found, the user is biometrically authenticated.

11. The tracking optics system of claim 10, wherein in response to the user failing authentication, content displayed on the mobile device is filtered to hide the content from the non-authenticated user.

12. The tracking optics system of claim 10, wherein the image sensor is implemented in a shape that matches a shape of a target of image capture.

13. The optics system of claim 12, wherein the target of image capture is an iris and the image sensor is annular-shaped.

14. The tracking optics system of claim 13, wherein the image sensor further includes an open middle portion, and wherein the illuminator is located collinear with the image sensor within the open middle portion, such that the illuminator emits a light source through the open middle portion of the image sensor.

15. The tracking optics system of claim 10, wherein the mobile device includes a camera for capturing at least one image including the target at a target position, wherein the target is outside of the field of view of the telescope when at least a first image of the at least one image is captured and wherein the processor further adjusts the position of the two-axis gimbal mirror around the two axes based on the target position in the at least one image.

16. The tracking optics system of claim 10, further including a lens, a fixed partial mirror, and an eyepiece lens, wherein:
the illuminator is positioned along a side of the telescope, and the light source emitted from illuminator is reflected off of the fixed partial mirror towards the two-axis gimbal mirror;
wherein the two-axis gimbal mirror reflects the light source out through a window in the case of the mobile device towards the target; and
wherein the light source reflects back off of the target and is reflected by the two-axis gimbal mirror towards the eyepiece lens and the image sensor to obtain the image.

17. The tracking optics system of claim 16, wherein one or more of the two-axis gimbal mirror, the illuminator, and the image sensor are implemented outside of the telescope.

18. A method for providing a tracking optics system for a mobile device, the method comprising:
activating an illuminator of a telescope in low power brightness mode to send an infrared light source through the telescope towards an iris of an eye, wherein the telescope is disposed along a longitudinal-axis of the mobile device, wherein a length of the telescope is greater than a depth of the mobile device;
adjusting a two-axis gimbal mirror around two axes to steer the light source towards the iris until the iris is within a field of view of the telescope;
activating the illuminator in the high power brightness mode to flash the iris with the light source, and capturing an image of the iris with an infrared image sensor; and
attempting to match, by an iris recognition component, the image of the iris with previously registered images stored to authenticate a user, such that if a match is found, the user is biometrically authenticated.

19. The method of claim 18, wherein in response to the user failing authentication, filtering content displayed on the mobile device to hide the content from the non-authenticated user.

20. The method of claim 18, wherein the image sensor is annular-shaped to match a shape of the iris.

21. The method of claim 20, wherein the image sensor further includes an open middle portion, and wherein the illuminator is located collinear with the image sensor within the open middle portion, such that the illuminator emits a light source through the open middle portion of the image sensor.

22. The method of claim 20, wherein the mobile device includes a camera for capturing at least one image including the target at a position, wherein the target is outside of the field of view of the telescope when at least a first image of the at least one image is captured and wherein the step of adjusting the two-axis gimbal mirror further includes adjusting around the two-axis gimbal mirror around the two axes based on the position of the target in the at least one image.

23. The method of claim 18, further including a lens, a fixed partial mirror, and an eyepiece lens, wherein:
the illuminator is positioned along a side of the telescope, and the light source emitted from illuminator is reflected off of the fixed partial mirror towards the two-axis gimbal mirror;
wherein the two-axis gimbal mirror reflects the light source out through a window in the case of the mobile device towards the target; and
wherein the light source reflects back off of the target and is reflected by the two-axis gimbal mirror towards the eyepiece lens and the image sensor to obtain the image.

24. The method of claim 18, further comprising: implementing one or more of the two-axis gimbal mirror, the illuminator, and the image sensor outside of the telescope.

* * * * *